Patented Mar. 28, 1933

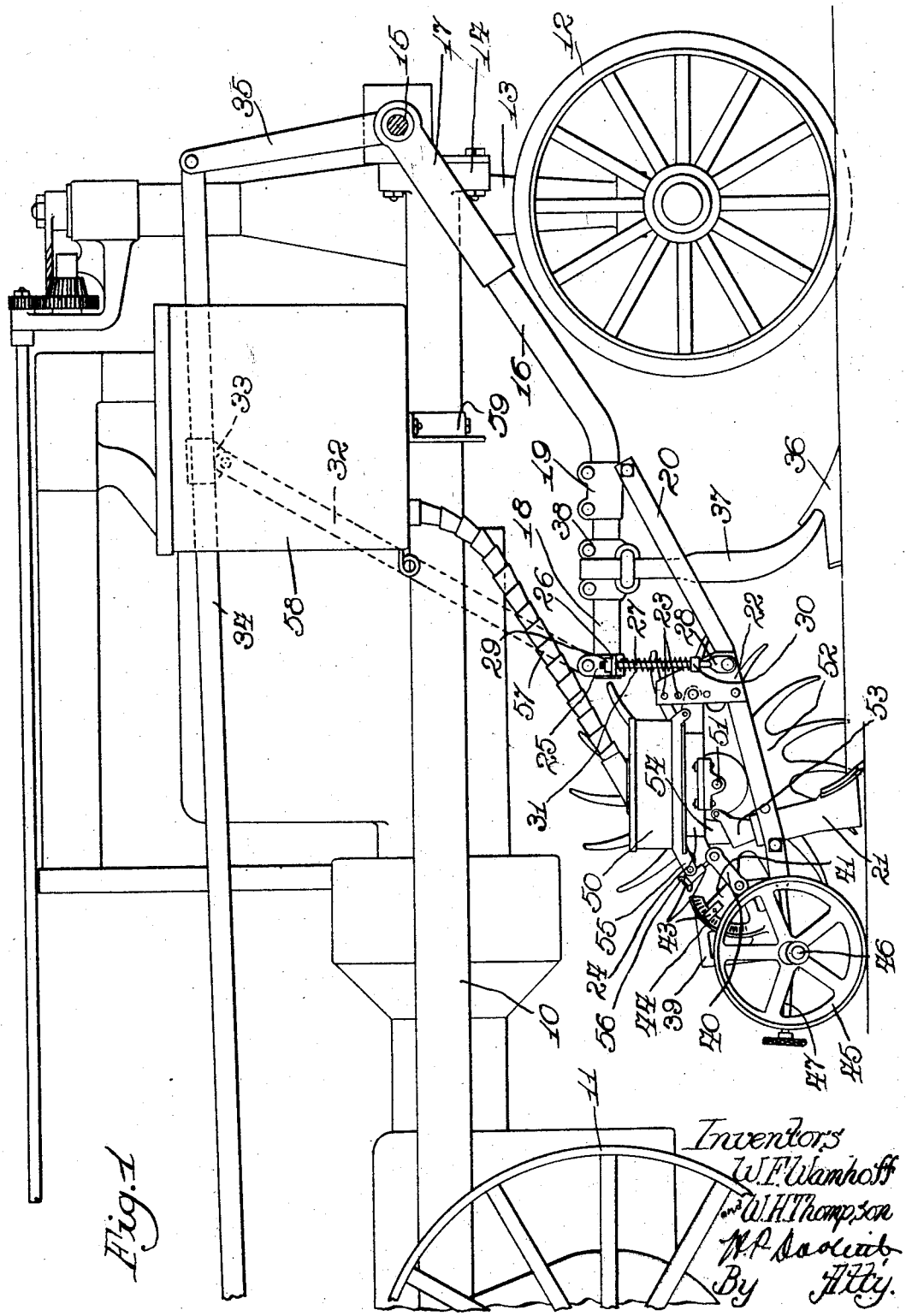

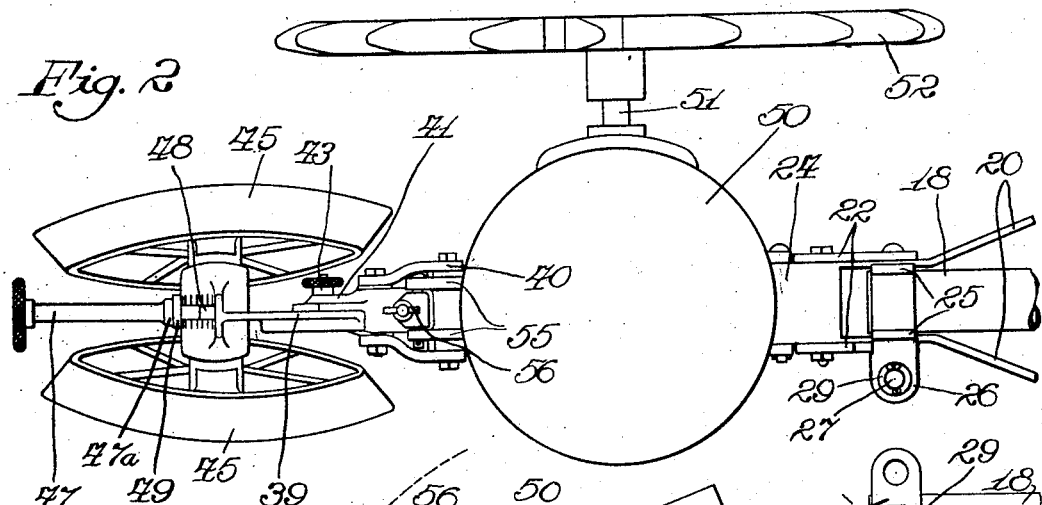
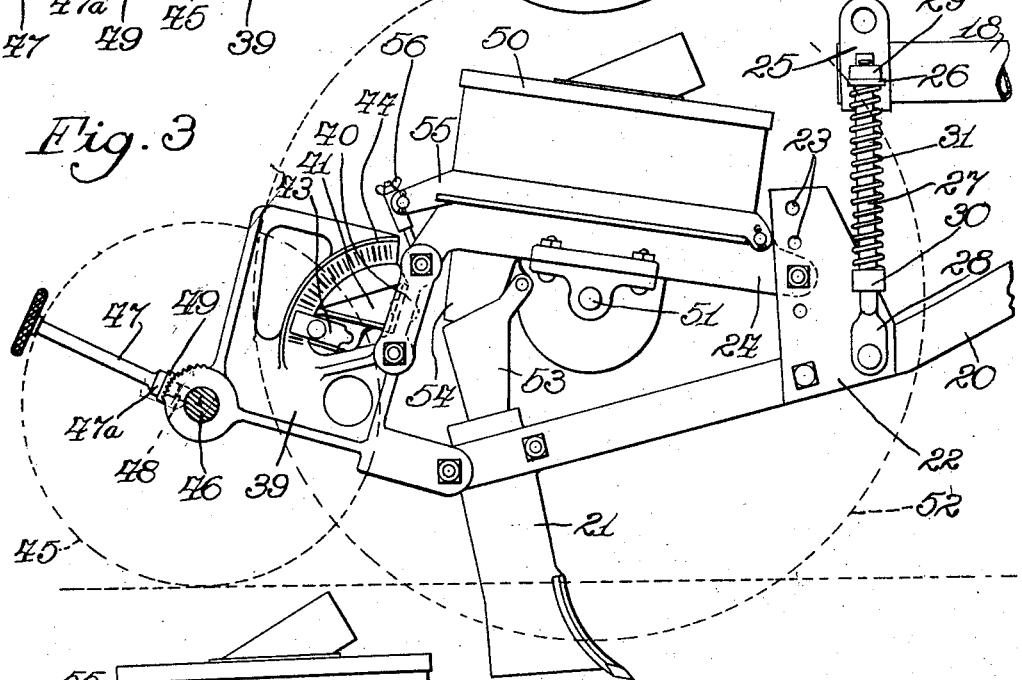
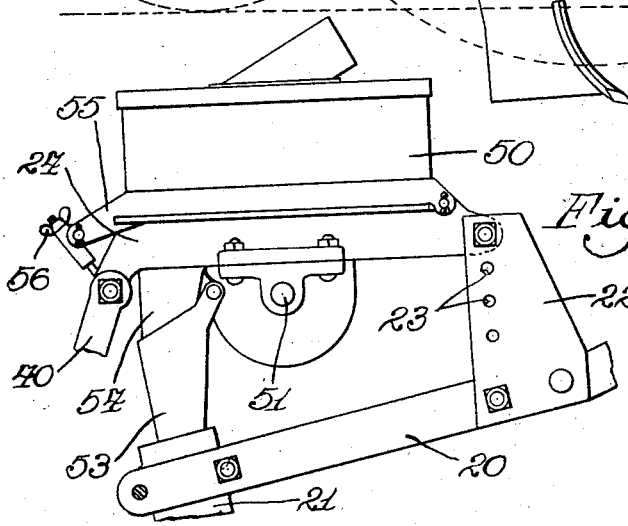

1,902,924

UNITED STATES PATENT OFFICE

WILLIAM F. WAMHOFF, OF EMBLEM, WYOMING, AND WILLIAM H. THOMPSON, OF CANTON, ILLINOIS, ASSIGNORS TO INTERNATIONAL HARVESTER COMPANY, A CORPORATION OF NEW JERSEY

PLANTER ATTACHMENT FOR TRACTORS

Application filed July 9, 1930. Serial No. 466,820.

This invention relates to a seed planter. More particularly, it relates to a planter attachment for tractors.

The principal object of the invention is to provide an improved tractor-mounted, side-connected planter structure particularly adapted for planting beet seed and the like.

Another object is to provide means for mounting a seeding mechanism and auxiliary seed hopper on a floating frame and to carry the main seed supplying box on a tractor frame.

Another object is to provide novel depth varying means for the seed depositing means.

Another object is to provide adjustable seed covering means.

Another object is to provide soil engaging driving means for the seed mechanism, which is adjustable with respect to the surface of the soil.

Other objects will be apparent from the detailed description to follow.

In the drawings:

Figure 1 is an elevation showing portions of a tractor with a planter embodying the invention attached thereto;

Figure 2 is an enlarged plan view of the planter unit;

Figure 3 is an enlarged elevation of the planter unit; and,

Figure 4 shows an adjusted position of the seed mechanism supporting frame.

The tractor illustrated is of a conventional construction having side frames 10, rear driving wheels 11, and forward steerable wheels 12. The wheels 12 are mounted on a steering column 13. A cross frame member 14 is positioned at the front of the frame 10. A shaft 15 is secured by brackets to the cross member 14. The member 15 is adapted to extend across the front of the tractor in order to provide for attaching units at each side of the tractor. As each unit is exactly similar, only one side is shown in the illustration. A downwardly, rearwardly extending beam 16 is pivotally attached on a transverse axis by a connecting member 17 to the shaft 15. The beam 16 has a substantially horizontal extension 18 to which the planter unit is attached. A bracket 19 is rigidly attached to the forward end of the horizontal portion 18. Bars 20 are pivotally attached to opposite sides of the bracket 19 and extend downwardly and rearwardly therefrom. The bars 20 are attached to and hold in operative position a furrow opening and seed depositing member 21. A pair of upwardly extending plate members 22 provided with a series of aligned openings 23 provide means for supporting the base 24 of the seed dispensing mechanism. The base 24 is pivoted on a transverse axis to the plates 22. The openings 23 are spaced, thereby providing means for adjusting the forward end of the supporting base vertically. A bracket 25 mounted at the rear end of the horizontal portion 18 of the beam 16 is provided with a laterally extending, apertured ear 26.

A rod 27 having a flattened head 28, which is pivotally attached at the side of one of the plate members 22 on a horizontal axis, extends through the apertured ear 26. A key collar 29 is fitted on the end of the rod 27 above the ear 26. A collar 30 positioned on the rod 28 forms a stop against which one end of a compression spring 31 abuts. The other end of the compression spring abuts against the lower surface of the ear 26. It will be understood that by this construction the bars 22 may move toward the beam 16 against the compression of the spring 31, the spring normally holding said members apart the angular distance determined by the length of the rod 27.

A link 32 is pivotally attached to the bracket 25 and to a bracket 33 mounted on a bar 34 extending horizontally from the front of the tractor to a position at the rear thereof. The front of the bar 34 is pivotally mounted on a link 35, which may be oscillated about the shaft 15. The rear end of the bar 34 is mounted for reciprocation in any well known manner for lifting and lowering the beam 16, which carries the planter mechanism.

A shovel 36 carried on a shank 37 is rigidly attached by a bracket 38 to the rearward extension of the beam 16. This shovel may be of any desired construction for agitating the soil in front of the furrow opening means. A member 39, which is constructed as a casting, is pivotally secured on a transverse axis at the rear of the bars 20. Upwardly and rearwardly from said pivot axis, the member 39 is also pivotally connected by a member 40 to the rear of the base 24, which supports the seeding mechanism. The member 40 has an integral extension 41, which is provided with a clamping means 43 for adjustably engaging an arcuate sector 44 formed on the member 39. This adjustment forms means for raising and lowering the position of the furrow opener 21 with respect to the surface of the soil.

A rolling support is provided at the rear of the member 39. Said support consists of a pair of wheels 45, which are mounted on the downwardly bent ends of an axle 46, so that the wheels are positioned at an angle with respect to each other. The wheels 45 have rims, which are tapered inwardly to provide means for covering the furrow and packing the soil firmly in position. A shaft 47 is secured to the axle 46 and extends radially therefrom through a slot 48 in the portion of the member 39 which forms the bearing for the axle 46. A roughened surface is provided adjacent the slot 48 against which a member 49 mounted on the shaft 47 may be tightly pressed by a shoulder 47ª on the shaft 47, to hold the axle 46 against rotation with respect to its bearing support. It will thus be seen that means is thereby provided for adjusting the axle 46 with respect to the member 39, whereby the bent ends on which the wheels 45 are mounted are given a different angular position. In this manner, the portions of the wheels on the ground are varied, so that the wheels are narrower or wider apart. This is desirable for different conditions of planting.

The base 24 carries a small seed hopper 50 and seed dispensing mechanism of a conventional nature, not shown, as it is not a part of this invention. A shaft 51 mounted below the base 24 is adapted to operate the seed dispensing mechanism. A toothed wheel 52 is mounted on the shaft 21 and is adapted to engage the soil whereby the shaft 51 is rotated during movement of the tractor. A seed spout 53 is pivotally mounted beneath the base 24 and extends into the top of the seed depositing member 21. An extension 54 below the base 24 provides means for delivering the seed from the dispensing mechanism into the spout 53. The seed hopper 50 is mounted on a base 55, which is hinged at one side to the base 24. At the other side, a clamp 56 is provided for holding the hopper securely in position. A flexible seed tube 57 is secured to the top of the seed hopper 50 and to the bottom of a relatively large seed supply hopper or tank 58, secured by a bracket 59 to the tractor frame.

In operation of this device, the planter unit is lowered into position by the operation of the bar 34 to lower the link 32. Wheels 45 engage the ground and the shovel 36 operates at a level gauged by the wheels 45. The furrow opening and seed depositing member 21 also operates at a depth gauged by the wheels 45. When it is found desirable to change the depth of planting, the clamp 43 is loosened and the extension 42 is mounted about the sector 44.

The toothed wheel 52 engages the ground and operates the seed dispensing mechanism. Seed delivered at uniform intervals drops down through the seed spout 53 into the furrow opening and seed depositing member 21. The plates 22, which form the front support for the seed dispensing mechanism, by reason of the spaced openings 23, provide means for vertically adjusting the front end of the base 24. By this adjustment, the depth at which the toothed wheel 52 engages the ground may be varied. It is desirable to have said wheel engaging the ground sufficiently to obtain a positive uniform operation of the seed mechanism; however, the wheel should not engage the ground sufficiently to have the tendency to raise the planter mechanism upwardly.

The spring 31 provides means for resiliently pressing the planter unit downwardly into engaging position. At the same time, the said spring, together with the rod 27, provide means for permitting the planter unit to raise vertically when an obstruction is encountered.

It will be understood that applicants have shown only a preferred embodiment of their improved device and that they claim as their invention all modifications falling within the scope of the appended claims.

What is claimed is:

1. A tractor seed planter comprising the combination with a tractor frame of a draft means pivotally secured at the front of the tractor frame laterally thereof on a transverse axis, a planter frame structure attached to the draft means, a rolling support for said structure, a seed dispensing mechanism and a seed hopper mounted thereon, a shaft adapted to operate said mechanism, a wheel mounted on said shaft operable to engage the ground and to drive said mechanism, a seed tank mounted on the tractor frame, and means adapted to deliver seed from said tank to the hopper.

2. A tractor seed planter comprising the combination with a tractor frame of a draft means pivotally secured at the front of the tractor frame on a transverse axis, a planter frame structure attached to the draft means, a rolling support for said structure, means for adjusting said support whereby the vertical position of the planter frame structure may be varied, a seeding mechanism and a seed hopper mounted thereon, a seed tank mounted on the tractor frame, and flexible means adapted to deliver seed from said tank to said hopper whereby the delivery of seed from the tank continues irrespective of the relative position of the frame structure.

3. A tractor seed planter comprising the combination with a tractor frame of a draft means pivotally secured thereto on a transverse axis and extending rearwardly therefrom, a planter frame structure pivotally attached to the draft means and extending rearwardly downwardly, a connection between the rearward end of the draft means and a point on the frame structure, said connection being adapted to limit relative angular movement of the draft means and the frame structure, means being provided for the movement of said elements toward each other against spring pressure, a rolling support positioned at the rear of the frame structure, a seed dispensing mechanism carried thereby, a ground engaging wheel mounted on the frame structure, driving connections between the seeding mechanism and said wheel, and means to adjust the vertical position of said wheel relative to the frame structure.

4. A seed planter comprising a frame structure, a furrow opening and seed depositing means secured to said structure, a forwardly mounted upstanding bracket attached to the frame structure, a base adapted to support a seeding mechanism pivotally secured to said member on a transverse axis, a member pivoted to the rear of the frame structure on a transverse axis, a rolling support mounted on said member, and means for pivotally connecting said member to the rear of the hopper base, said means being provided with an adjustment for clamping the member in a plurality of angular positions relative to the base.

5. A seed planter comprising a frame structure, a furrow opening and seed depositing means secured to said structure, a forwardly mounted upstanding bracket attached to the frame structure, a base adapted to support a seeding mechanism pivotally secured to said member on a transverse axis, means being provided for adjusting the pivot axis vertically on said member, a member pivoted to the rear of the frame structure on a transverse axis, a rolling support mounted on said member, and means for pivotally connecting said member to the rear of the hopper base, said means being provided with an adjustment for clamping the member in a plurality of angular positions relative to the base.

6. A seed planter comprising a frame structure, a furrow opening and seed depositing means secured to said structure, a forwardly mounted upstanding bracket attached to the frame structure, a base adapted to support a seeding mechanism pivotally secured to said member on a transverse axis, seeding mechanism mounted on said base, a shaft extending therefrom and adapted to drive said mechanism, a ground engaging wheel mounted on said shaft, the means for pivotally securing the base to the upstanding member being adjustable vertically whereby the position of said wheel relative to the ground level may be varied, a member pivoted to the rear of the frame structure on a transverse axis, a rolling support mounted on said member, and means for pivotally connecting said member to the rear of the hopper base, said means being provided with an adjustment for clamping the member in a plurality of angular positions relative to the base.

7. A tractor seed planter comprising the combination with the tractor frame of a supporting shaft mounted at the front of the tractor frame, a draft means pivotally secured to said shaft and extending rearwardly downwardly therefrom and terminating in a substantially horizontal portion, a planter frame structure pivotally attached to the forward end of said horizontal portion and extending downwardly rearwardly therefrom, a connection between the rearward end of the horizontal portion and the frame structure, said connection being adapted to limit angular movement of the beam and the frame structure away from each other and to provide for movement of said elements toward each other against spring pressure, a rolling support positioned at the rear of the frame structure, means for adjusting said suport, a seeding mechanism carried by the frame structure, a toothed wheel operable to engage the ground and to drive said mechanism, a seed hopper mounted on the frame structure, a seed tank positioned on the tractor frame, and flexible means adapted to deliver seed from said tank to the seed hopper on the planter frame.

8. A tractor mounted planter comprising, in combination with a tractor, a seed supply hopper mounted thereon, a soil engaging planter unit pivotally attached to the tractor, a seed hopper and an associated seeding mechanism mounted on the planter unit, means for driving said mechanism, and means for delivering seed from the supply hopper to the hopper on the planter unit, said means including flexible connections to provide for movement of the planter unit relative to the tractor.

9. A tractor mounted planter comprising, in combination with a tractor, a seed supply hopper mounted thereon, a soil engaging planter unit pivotally attached to the tractor, a seed hopper and an associated seeding mechanism mounted on the planter unit, means for driving said mechanism, and a flexible seed tube connected to the supply hopper and to the hopper on the planter unit.

10. A tractor mounted planter comprising, in combination with the frame of a tractor, a draft means pivotally secured at the front of the tractor frame laterally thereof on a transverse axis, a planter frame structure attached to the draft means, a rolling support for said structure, a seed dispensing mechanism and a seed hopper mounted thereon, means for driving said mechanism, a seed supply hopper mounted on the tractor frame, and means for delivering seed from said hopper to the hopper on the planter frame structure, said means including flexible connections to provide for movement of the planter unit relative to the tractor.

In testimony whereof we affix our signatures.

WILLIAM F. WAMHOFF.
WILLIAM H. THOMPSON.